US006916034B2

(12) United States Patent
Elliott

(10) Patent No.: US 6,916,034 B2
(45) Date of Patent: Jul. 12, 2005

(54) CYCLE FOOT PEG ASSEMBLY

(76) Inventor: Pierre J. Elliott, 10145 NW. 46th St., Sunrise, FL (US) 33351

( * ) Notice: Subject to any disclaimer, the term of this patent is extended or adjusted under 35 U.S.C. 154(b) by 0 days.

(21) Appl. No.: 10/142,341

(22) Filed: May 10, 2002

(65) Prior Publication Data

US 2003/0209876 A1 Nov. 13, 2003

(51) Int. Cl.⁷ .................................................. B62H 1/08
(52) U.S. Cl. ...................................................... 280/291
(58) Field of Search ............................... 280/288.4, 291; 296/75

(56) References Cited

U.S. PATENT DOCUMENTS

| | | | | |
|---|---|---|---|---|
| 5,454,580 A | * | 10/1995 | Lin | 280/291 |
| 5,482,307 A | * | 1/1996 | Lin | 280/291 |
| 5,524,918 A | * | 6/1996 | Peabody et al. | 280/291 |
| 5,638,723 A | * | 6/1997 | Lin | 74/564 |
| 5,826,900 A | * | 10/1998 | Steele | 280/291 |
| 6,070,897 A | * | 6/2000 | Hsieh et al. | 280/291 |
| 6,161,859 A | * | 12/2000 | Cheng | 280/291 |
| 6,339,972 B1 | * | 1/2002 | Paris | 74/564 |

\* cited by examiner

*Primary Examiner*—Lesley D. Morris
*Assistant Examiner*—L. Lum
(74) *Attorney, Agent, or Firm*—M. K. Silverman; Yi Li

(57) ABSTRACT

The instant invention relates to a cycle foot peg assembly for engagement with the boot of a rider thereof. The assembly includes a foot peg housing comprising a proximal end and an open distal end, the proximal end including means for rigid connection to a frame of the cycle; and an elongate segment integrally between the proximal and distal ends, the segment including a bore therein having a longitudinal axis co-linear with a longitudinal axis of the foot peg housing, the bore in communication with the open distal end thereof. The assembly further includes a foot peg defining a greater longitudinal length than the axis of the bore of the elongate segment, the foot peg proportioned for complemental securable engagement within the bore, the peg further comprising a substantially hemispherical distal end, protruding beyond the open distal end of the foot peg housing, to a greatest axial dimension in a range of about 7.5 to about 15 millimeters.

8 Claims, 3 Drawing Sheets

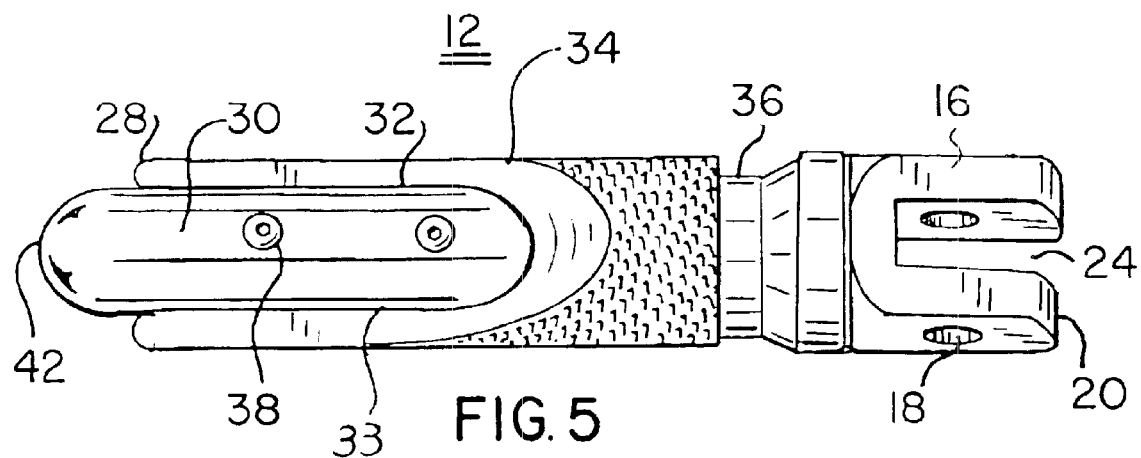
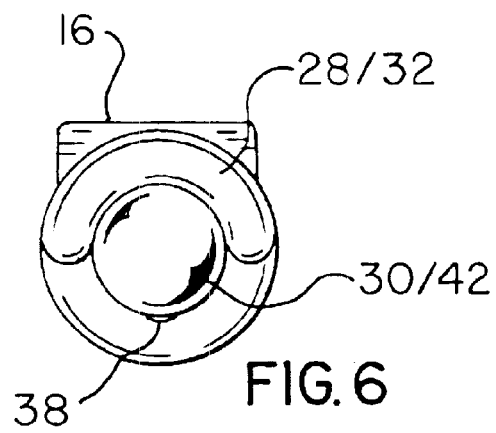
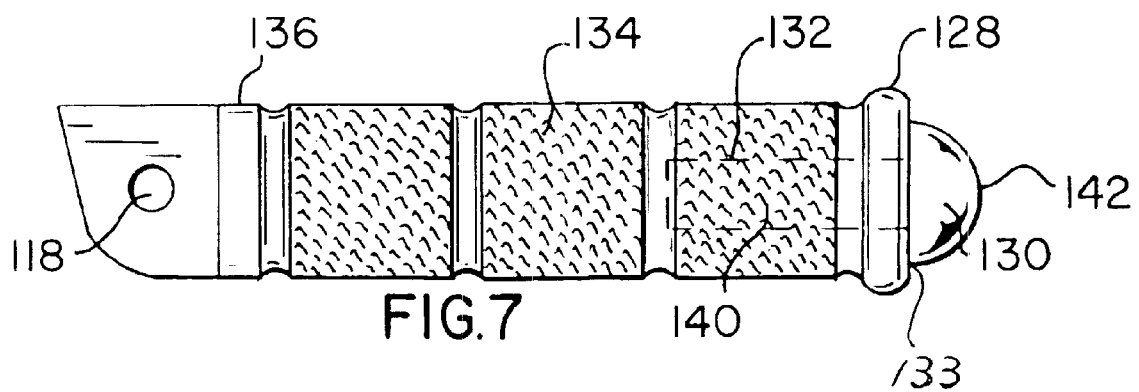

CYCLE FOOT PEG ASSEMBLY

BACKGROUND OF THE INVENTION

1. Field of Invention

This invention relates to an invention in a cycle foot assembly of a type typically mounted upon motorcycles of various types.

2. Prior Art

Motorcycle riding and racing involves the use of the motorcycle on terrain which may be rough or uneven and, as well, often involves the navigation of sharp turns which may take the foot pedals, also termed foot pegs or foot peg assemblies, of the cycle close to, or in contact with, the road or ground itself. Distribution of the rider's weight is an important factor in balance of the cycle in that the weight of the rider will shift from side-to-side as he maneuvers through curves and/or over bumps in the terrain. As such, any event which interferes with the normal shifting of weight or center of gravity of the rider relative to the cycle during such turning or traversing of uneven terrain can induce a vibration, shock, or torque to the foot peg assembly and, thereby, to the cycle frame and cycle itself in which a potentially disastrous result can occur if the end of the foot peg engages the road or terrain beneath the cycle.

The prior art, as is represented in such patents as U.S. Pat. No. 4,797,791 (1989) to Burchick; U.S. Pat. No. 5,826,900 (1998) to Steele; and U.S. Pat. No. 6,339,972 (2002 to Paris) all address the importance of cycle foot peg assemblies, but each addresses respectively different problems and as solutions, associated therewith. However, neither this art, nor any other known to the inventor, has considered, or in anyway addressed a means by which the risk of accident to a cycle and injury to the cyclist may be diminished in the event of contact between the outer or distal-most end of the foot peg assembly and the earth or road therebeneath.

The instant invention thereby addresses a long felt need in the art that has not, therebefore, been addressed.

SUMMARY OF THE INVENTION

The instant invention relates to a cycle foot peg assembly for engagement with the boot of a rider thereof. The assembly includes a foot peg housing comprising a proximal end and an open distal end, said proximal end including means for rigid connection to a frame of said cycle; and an elongate segment integrally between said proximal and distal ends, said segment including a bore therein having a longitudinal axis co-linear with a longitudinal axis of said foot peg housing, said bore in communication with said open distal end thereof. The assembly further includes a foot peg defining a greater longitudinal length than said axis of said bore of said elongate segment, said foot peg proportioned for complemental securable engagement within said bore, said peg further comprising a substantially hemispherical distal end, protruding beyond said open distal end of said foot peg housing, to a greatest axial dimension in a range of about 7.5 to about 15 millimeters.

It is an object of the present invention to provide an improved cycle foot peg assembly which will afford to a rider reduced chance of accident and, thereby, greater safety in the event of inadvertent contact between the outermost edge of the foot peg assembly and ground or road into which it may come in contact.

It is another object to provide a foot peg assembly of the above type which is compatible with known and existing types of foot peg assemblies of cycles of all types, and which provides protection to the foot peg assembly if he cycle topples over.

It is a still further object to provide a foot peg assembly which also contributes to the aesthetics of the motorcycle and provides a potential for color coordination with colors associated with the painting and upholstery of the motorcycle proper.

It is a further object to provide a foot peg assembly of the above type which will provide for enhanced visibility of the cycle from the front and rear thereof.

The above and yet other objects and advantages of the present invention will become apparent from the hereinafter set forth Brief Description of the Drawings, Detailed Description of the Invention, and claims appended herewith.

BRIEF DESCRIPTION OF THE DRAWINGS

FIG. 2 is a front schematic view illustrating the type of accident which it is an object of the invention to reduce the possibility of.

FIG. 5 is a bottom elevational view of the foot peg assembly of FIG. 3.

FIG. 6 is an axial end view showing the diametric relationships between elements of the present invention.

FIG. 7 is a side elevational view of a second embodiment of the present invention.

DETAILED DESCRIPTION OF THE INVENTION

Figure 1:
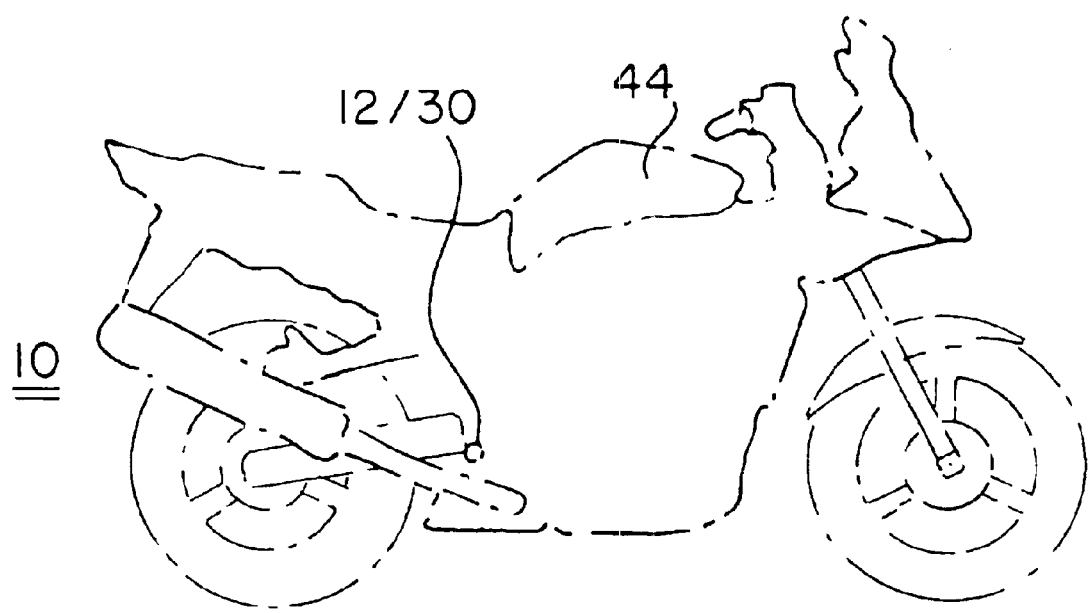
FIG. 1 is a side phantom view of a prior art of a cycle showing a typical location of the foot pegs thereof.

With reference to the phantom view of FIG. 1, a sport cycle 10 in accordance with the present invention may be seen to include many standard features, these including, without limitation, a foot peg assembly 12. Such assemblies are typically secured to a frame 14 (see FIG. 2) of the cycle through an end flange 16 (see FIG. 3) of the foot peg assembly and a bolt (not shown) which is positioned within a channel 18 within a proximal end 20 of the foot peg assembly 12. The structure of proximal end 20 is such that it includes a solid substantially rectangular open region 24 through which said channel 18 transversely passes. Such a connection to cycle frame 14 enables the foot peg assembly to be selectably flipped upward and, thereby, away from the legs of the rider when he does not wish to make use of the foot peg assembly.

Figure 2:
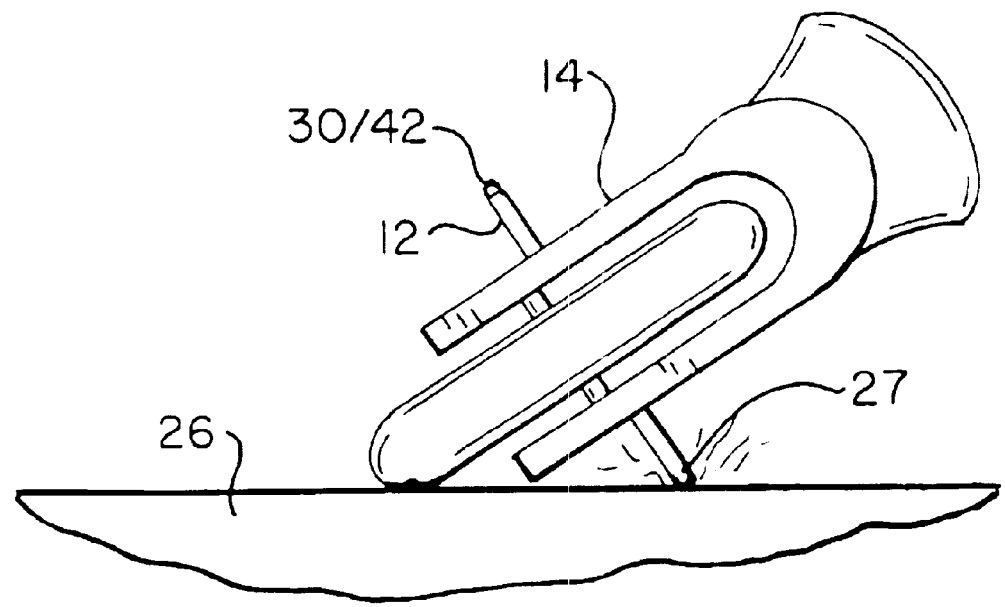
Figure 3:
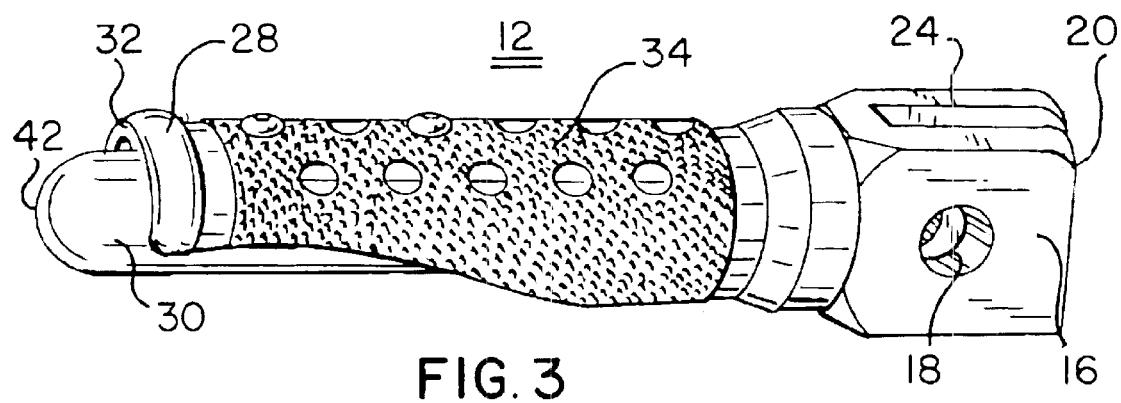
FIG. 3 is a side elevational view of the inventive cycle foot peg assembly.

As may be noted in FIG. 2, the need for the instant invention arises from the propensity of cycle riders to navigate their bikes in a fashion which gives rise to frequent contact between ground or road 26 (see FIG. 2) and a distal most end 42 of the foot peg assembly.

Thereby, in the absence of the instant invention, end 42 of the typically metallic foot peg assembly will contact earth or road 26 thereby creating sufficient friction and torque therebetween to impart serious vibration and, in the extreme, rotation or "flip" of the cycle itself, the result being highly unfortunate to the cycle and cycle rider. Even in a situation where the contact between distal end 42 of foot peg assembly 12 and earth or road 26 is not sufficient to cause a major accident, it will nonetheless result in damage to the end of foot peg assembly including possibly bending of the bolt (not shown), the passes through channel 18 of the proximal, end of the assembly, or bending of said end flange 16.

Figure 4:
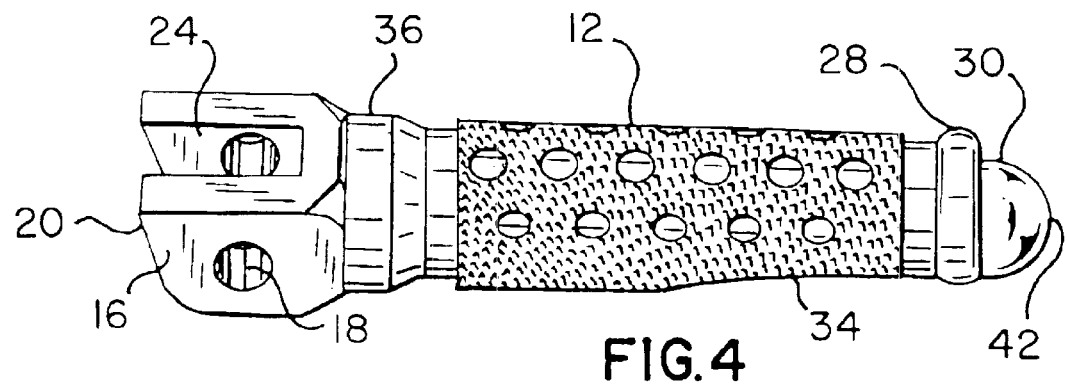
FIG. 4 is a substantially top perspective view of the assembly of FIG. 3.

The present invention addresses this hazard associated with cycle operation by the provision of a foot peg 30 (see FIGS. 4–6) which is proportioned for insertion within an open-end face 32 of a distal end 28 of the foot peg assembly 12. Therein, said foot peg 30 will typically comprise a solid elongate longitudinal structure which is secured within an internal cavity, bore 33 of foot peg housing 34 which integrally connects said distal end 28 and cylinder region 36, of the foot peg housing 34 located distally of cycle frame connection flange 16. It is to be appreciated that cavity 33 may be partially open, as in the case of the embodiment of FIGS. 3 to 6 or, alternatively, as in the case in the embodiment of FIG. 7, cavity, or bore 133 may be completely internal to elongate segment 134 between region 136 and distal end 128 of the foot peg housing. However, in either embodiment, there is foot peg 30 or 130 respectively which is securable within respective cavity 33 or 133, either through the use of screws 38 (see FIGS. 5 and 6) or through a press fit insertion of an elongate portion 140 of peg 130 into bore 133 as is shown in the embodiment of FIG. 7.

Both interior cavity 33 in the embodiment of FIGS. 3 thru 6, and bore 133 in the embodiment of FIG. 7, are characterized by a longitudinal axis which is co-linear with a longitudinal axis of foot peg 30 or 130 respectively. Further, in each case the internal cavity or bore is in communication with said open distal end 28 of the foot peg housing 34.

As may be further noted, foot peg 30 must have a greater longitudinal length than the length of the axis of the cavity or bore 33/133 within foot peg housing 34/134.

Further, it has been found, for the instant invention to operate in the intended fashion, said foot peg 30/130 must be made of the material which, while softer than the metal of which the foot peg housing is made, must still possess properties of high impact resistance arid high fatigue endurance. The inventor has found that an acetyl homopolymer resin thermoplastic, known commercially as DELRIN, possesses such properties. In addition, DELRIN is a thermal insulator; thereby its temperature cannot approach that of the frame of the motorcycle and, as well, it will assist in the overall cooling of the foot peg housing.

As important as the above, is the substantially hemispheric geometry of a distal end 42/142 of foot peg 30/130. More particularly, it has been found that a foot peg made of such a high impact resistance, high fatigue endurance thermoplastic which is rounded at the end thereof will provide minimum friction and maximum protection against catching or engagement with ground or road 26, thereby affording the desired functionality of the invention.

The within inventor has also determined that certain dimensions and relationships thereof are necessary to optimize the above set forth advantageous function. More particularly, it has been found that an extension of distal end 42 of foot peg 30 beyond open-end face 32 of the distal end 28 in a range of about 7.5 to about 15 millimeters is necessary to achieve a necessary balance between functionality and the aesthetics of the foot peg assembly. Therein, an extension distance of about ten millimeters has been found to be optimal. Further, as may be particularly noted with reference to FIG. 6, it has been determined that a ratio of the diameter of the foot peg 30, to the diameter of distal end 28 of foot peg housing 34, falls within a range of about 35% to about 70%, wherein 55 to 60 percent constitutes an optimum sub-range thereof.

It has been additionally found that a beneficial dimension between foot peg assembly pivot point channel 18/118 and distal end 28/128 of the foot peg housing 34 defines a range of about 90 to about 100 millimeters and that a typical distance between the extreme proximal end of flange 16 and distal end 42 of foot peg 30 is about 122 millimeters. Further, the outside diameter of distal end 28 of foot peg housing 34 is preferably about 26 millimeters while the diameter of the foot peg 30 is about 16 millimeters, thereby yielding said above recited ratio of between about 55 and about 60 percent therebetween. As such, the radius of curvature of hemispherical outer end 42/142 of the foot peg is typically about 8 millimeters.

It is yet further noted that the embodiment of FIGS. 3 to 6 enhances the visibility of the foot peg 30 which, to many users is beneficial in that it permits color coordination between the foot peg assembly and other colors, such as that of leather or upholstery 44 (see FIG. 1) associated with the cycle 10. Accordingly, a cycle dealer may be provided with foot pegs 30 in a variety of different colors such that, after purchase by a prospective owner, and determination of the colors of the upholstery and paint of the cycle, a peg that is color coordinated therewith may be selected.

The invention also provides a further functional benefit, i.e., the protection of the foot peg assembly and, to a lesser extent, the cycle itself, in the event that the cycle is accidentally toppled and falls to the ground or road. When, in the prior art, this occurs, damage to the metallic foot peg assembly is common. That is, distinction, the present invention protects the foot peg assembly 12 from damage if, for any reason, it comes into contact with any hard surface.

Finally, it is noted that, with particular reference to the embodiment of FIGS. 3 to 6, the polymer of said foot peg 30 may be provided with a pigment which includes an iridescence to thereby enhance visibility of the motorcycle, from front or back, at night.

While there has been shown and described the preferred embodiment of the instant invention it is to be appreciated that the invention may be embodied otherwise than is herein specifically shown and described and that, within said embodiment, certain changes may be made in the form and arrangement of the parts without departing from the underlying ideas or principles of this invention as set forth in the Claims appended herewith.

What is claimed is:

1. A cycle foot peg assembly for engagement with a boot of a rider thereof, said assembly comprising:
   (a) a foot peg housing comprising a proximal end and an open distal end, said proximal end including means for rigid connection to a frame of said cycle; and an elongate segment integrally between said proximal and distal ends, said segment including a bore therein having a longitudinal axis co-linear with a longitudinal axis of said foot peg housing, said bore in communication with said open distal end thereof; and
   (b) an integral solid foot peg made of a high impact resistance, high fatigue endurance thermoplastic, proportioned for complemental securable engagement within said bore, said foot peg defining a greater longitudinal length than said longitudinal axis of said foot peg housing, and comprising a substantially hemispherical distal end, protruding beyond said open distal end of said foot peg housing, to a greatest axial dimension in a range of about 7.5 to about 15 millimeters.

2. The cycle foot peg assembly as recited in claim 1, in which said thermoplastic is an acetyl homopolymer resin.

3. The cycle foot peg assembly as recited in claim 1, in which said foot peg is substantially cylindrical.

4. The cycle foot peg assembly as recited in claim 1, in which a ratio of a diameter of said foot peg to a diameter of said foot peg housing defines a range of about 35% to about 70%.

5. The cycle foot peg assembly as recited in claim 4, in which said greatest axial dimension of extent of said protrusion beyond said open distal end of said foot peg housing, to a total length from said connection means of said foot peg housing to said open distal end thereof defines, a ratio of about 7% to about 12%.

6. The cycle foot peg assembly as recited in claim 5, in which said axis of said bore defines a dimension of between about 40% and 75% of a total axial length of said foot peg housing.

7. The cycle foot peg assembly as recited in claim 1, in which an upper surface of said foot peg housing includes apertures to enhance visibility of said foot peg.

8. The cycle foot peg assembly as recited in claim 1, in which a lower surface of said foot peg housing is partially open to enhance visibility of said foot peg.

* * * * *